Aug. 7, 1934. F. D. BRANDT, JR Re. 19,262

COMBINED PEDAL AND FOOT REST

Original Filed May 24, 1930 2 Sheets-Sheet 1

Frederick D. Brandt, Jr.
INVENTOR

BY Victor J. Evans
ATTORNEY

COMBINED PEDAL AND FOOT REST
Original Filed May 24, 1930 2 Sheets-Sheet 2
Fig. 3.
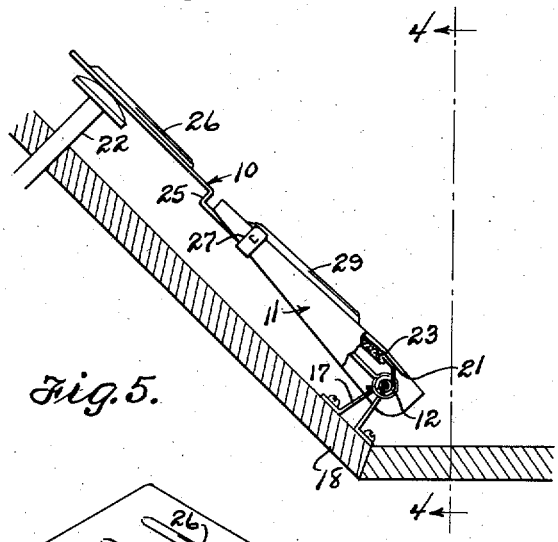
Fig. 4.
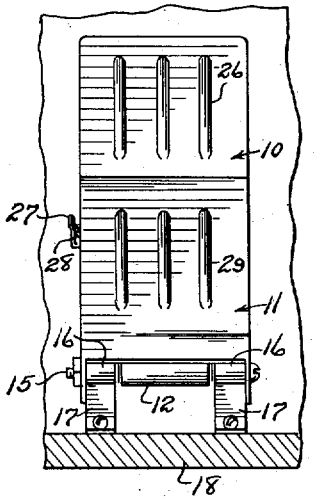
Fig. 5.
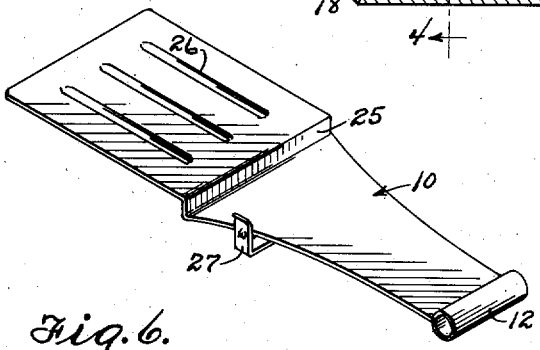
Fig. 6.
Fig. 7.
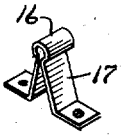
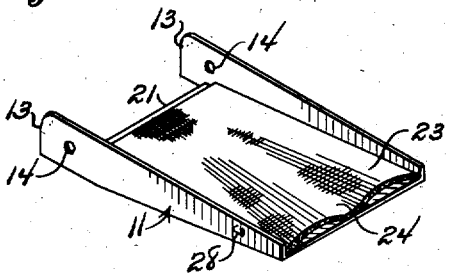
Fig. 8.
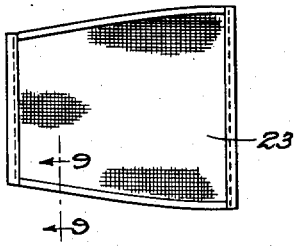
Fig. 9.
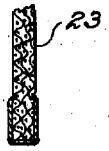
Frederick D. Brandt, Jr.
INVENTOR
BY Victor J. Evans
ATTORNEY Reissued Aug. 7, 1934 Re. 19,262

UNITED STATES PATENT OFFICE 19,262

COMBINED PEDAL AND FOOT REST

Frederick D. Brandt, Jr., Houston, Tex.

Original No. 1,831,736, dated November 10, 1931, Serial No. 455,375, May 24, 1930. Application for reissue May 4, 1933, Serial No. 669,374

5 Claims. (Cl. 74—513)

This invention relates to a combined foot rest and pedal and has for an object the provision of means which may be attached to the floorboard of an automobile to provide a rest for the foot of the driver in the operation of the accelerator, so that the automobile may be operated with a maximum degree of comfort.

Another object of the invention is the provision of a device of the above character which, when arranged for the use of a woman driver will afford a maximum amount of comfort for her foot and protection for her shoe, and which may be arranged for the convenient use of a male driver, the construction being such that the change may be made by the foot of the driver.

Another object of the invention is the provision of a device of the above character which is simple in construction, may be readily secured in position for use, and which may be conveniently adjusted to either of two operative positions.

With the above and other objects in view, the invention further includes the following novel features and details of construction, to be hereinafter more fully described, illustrated in the accompanying drawings and pointed out in the appended claims.

In the drawings:

Fig. 3 is a view similar to Fig. 1 showing the device folded for use with low heel shoes.

Fig. 4 is a sectional view taken substantially on the line 4—4 of Fig. 3.

Fig. 5 is a detail perspective view of the toe section.

Fig. 6 is a like view of the heel section.

Fig. 7 is a detail perspective view of one of the bearing brackets.

Fig. 8 is a plan view of one of the pads.

Fig. 9 is an enlarged fragmentary sectional view on the line 9—9 of Fig. 8.

Figure 1:
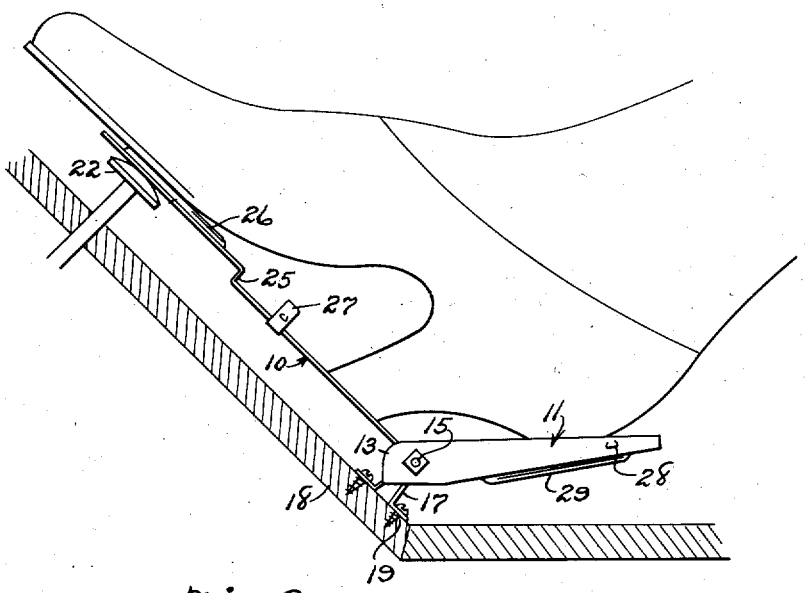
Fig. 1 is a view illustrating the use of the invention with high heels, a fragmentary portion of the floorboards of an automobile being shown in section.

Referring to the drawings in detail wherein like characters of reference denote corresponding parts, the device as shown comprises two sections which, for convenience, will be hereinafter referred to as a toe section 10 and a heel section 11. The toe section is provided at its lower end with a transversely extending tubular portion or sleeve 12, Fig. 5, while the heel section is provided with spaced ears 13 having openings 14 therein. A pivot pin 15 passes through these openings and through the sleeve 12 and serves to pivotally connect the sections together. In addition, this pivot pin passes through eyes 16 provided in the upper ends of bearing brackets 17, the latter being adapted to be secured to the floorboard 18 of the automobile as shown at 19. The device is thus pivotally mounted upon the floorboard with the point of pivotal connection spaced above the board.

Figure 2:
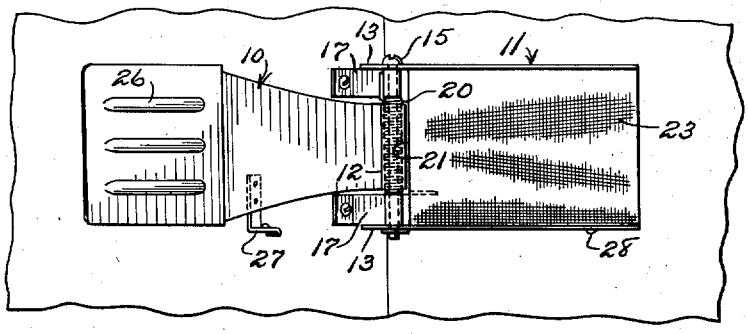
Fig. 2 is a top plan view with the parts in the position shown in Fig. 1.

A coiled spring 20 is mounted within the sleeve 12 and is arranged to force the sections relatively outward as shown in Figures 1 and 2 of the drawings. Outward pivotal movement of the section 11 is limited by contact of the inner end 21 of this section with the bearing brackets 17. The heel section 11 is thus spaced above the floorboard when in one operative position as seen in Fig. 1.

When used by a female driver, the device is arranged as shown in Figs. 1 and 2. In this position, the toe section rests upon the accelerator 22. The foot is positioned upon the section 10, while the upper part or counter of the shoe rests upon the section 11 and against a lining or pad 23, carried by the section 11. This prevents injury to the shoe due to chafing or rubbing.

The lining or pad 23 is removable, one of these linings or pads being illustrated in Fig. 8. The side edges of the pad are relatively inclined so that one end is wider than the other. This wide end is positioned within the outer end of the section 11, and being wider than the said section will be corrugated so as to provide a heel receiving portion as shown at 24 in Fig. 6 of the drawings.

The toe section is provided with an offset portion 25 and with longitudinally disposed ribs 26 to prevent the shoe from slipping laterally.

When the device is to be used by a driver wearing low heel shoes, the section 11 is folded inward to another or different operative position upon the section 10 and is held in folded position by means of a spring latch 27 which extends from the side of the section 10 and detachably engages a projection 28 which extends from the side of the section 11. The section 11 is spaced sufficiently from the floorboard to permit the driver to insert his toe beneath the outer end of the said section and fold the latter inward until engaged by the spring latch 27. The under face of the section 11 as seen in Fig. 1 is provided with spaced ribs 29 which, when the section 11 is folded, will be in position for engagement by the foot of the driver.

In order to release the section 11 from the latch 27, it is only necessary to press the latch slightly with the foot so as to permit the section 11 to pivot outwardly to unfolded operative position under the influence of the spring 20.

The invention is susceptible to use with two types of footwear, namely high and low heeled shoes, and it is to be understood that various changes in its form, proportions and minor details of construction may be made and the right is herein reserved to make such changes as properly fall within the scope of the appended claims.

Having described the invention what I claim as new is:

1. In a device of the kind described, a pair of bearings adapted to be mounted spaced from an accelerator pedal, a toe piece having a pintle journaled in the bearings to dispose said piece superimposed on the pedal, a heel piece swingingly connected to the pintle for outward limited movement through the toe piece and having side edge ledges, a lining in the heel piece, and a coiled spring carried by the pintle and tensioning the heel piece to urge it in open relation to the toe piece.

2. In a device of the kind described, a pair of bearings adapted to be mounted spaced from an accelerator pedal, a toe piece having a pintle journaled in the bearings to dispose said piece superimposed on the pedal, a heel piece swingingly connected to the pintle for outward limited movement through the toe piece and having side edge ledges, a lining in the heel piece, a coiled spring carried by the pintle and tensioning the heel piece to urge it in open relation to the toe piece, and a latch for fastening the heel piece normally flat against the toe piece.

3. An accelerator pedal including a toe section, a heel section, a pivot for said heel section whereby said heel section may be pivoted to either of two operative positions to accommodate two types of footwear, means to latch said heel section in one operative position, and additional means to move said heel section from one operative position to the other upon release of said latch means.

4. An auxiliary accelerator pedal including a foot plate, a heel plate pivotally connected thereto, means tending to swing said heel plate on its pivot away from said foot plate to a position behind the driver's heel, and a latch holding said heel plate in position below the driver's heel, said heel plate swinging automatically away from said footplate when said latch is released.

5. An accelerator pedal including a foot plate, a heel plate pivotally connected therewith, a latch holding said heel plate approximately in the plane of said foot plate, and means acting automatically when said latch is released to throw said heel plate on its pivot away from said footplate in position to furnish a support behind the foot of the driver.

FREDERICK D. BRANDT, JR.